United States Patent [19]

Van Rosmalen et al.

[11] Patent Number: 4,890,905
[45] Date of Patent: Jan. 2, 1990

[54] REPLICA LENS AND METHOD OF MANUFACTURING SAME

[75] Inventors: Gerard E. Van Rosmalen; Renso J. M. Zwiers; Gerardus C. M. Dortant, all of Eindhoven, Netherlands

[73] Assignee: U.S. Philips Corp., New York, N.Y.

[21] Appl. No.: 871,015

[22] Filed: Jun. 5, 1986

[30] Foreign Application Priority Data

Jun. 10, 1985 [NL] Netherlands .......................... 8501665
Aug. 12, 1985 [NL] Netherlands .......................... 8502225

[51] Int. Cl.$^4$ .............................................. G02B 3/02
[52] U.S. Cl. .................................... 350/482; 350/417; 350/432; 350/444
[58] Field of Search ............... 350/482, 417, 432, 444, 350/DIG. 3

[56] References Cited

U.S. PATENT DOCUMENTS 3,350,557 10/1967 Szymanski .................... 350/DIG. 3
4,227,950 10/1980 Spycher ............................. 350/417
4,641,929 2/1987 Braat .................................. 350/432
4,657,354 4/1987 Kobayashi ......................... 350/417
4,668,056 5/1987 Braat et al. ......................... 350/432

Primary Examiner—Bruce Y. Arnold
Assistant Examiner—Rebecca D. Gass
Attorney, Agent, or Firm—Ernestine C. Bartlett

[57] ABSTRACT

Replica lens having a transparent lens body comprising one or more correction layers of a synthetic resin as well as a bonding layer of a synthetic resin with which the lens body is bonded to one or more auxiliary means or optical components, as well as a method of manufacturing the replica lens.

15 Claims, 1 Drawing Sheet

REPLICA LENS AND METHOD OF MANUFACTURING SAME

The invention relates to a refractive lens having a transparent lens body at least one reflective surface of which comprises a correction layer of a synthetic resin which gives the lens body the desired optical profile.

BACKGROUND OF THE INVENTION

Such a replica lens is manufactured according to a replica process known per se. The replica process uses a mold or matrix having an accurately defined surface which is the negative of the desired optical profile of the replica lens. In the exact determination of the definition of the surface of the mold or matrix, the shrinkage of the synthetic resin of the replica lens has been taken into account. A small quantity of a liquid curable synthetic resin composition is provided on the surface of the mold. The transparent lens body is then pressed with its refractive surface against the mold, or conversely, the synthetic resin spreading between the lens body surface and the mold surface. Instead of the mold, the lens body may alternatively be provided with the liquid synthetic resin composition. The synthetic resin is cured and the lens body together with the cured synthetic resin layer bonded thereto is removed from the mold. The free surface of the synthetic resin layer is the negative of that of the mold. The advantage of the replica process if that lenses with a complicated refractive surface, for example an aspherical surface, can be manufactured in a simple manner without requiring complicated grinding and polishing of the lens body. A lens body will suffice which has a simple refractive surface, for example, a spherical (convex or concave) surface. The lens body is manufactured, for example, from aan optical glass type or quartz.

SUMMARY OF THE INVENTION

An object of the invention is to provide an improved replica lens.

According to the invention this object is achieved by means of a replica lens of the type mentioned in the opening paragraph which is characterized in that the lens body comprises one or more auxiliary means or optical components which are bonded to the lens body by using a bonding layer of a synthetic resin.

Both the correction layer and the bonding layer are preferably manufactured from a light-cured, for example ultraviolet or UV-light-cured, synthetic resin composition. The synthetic resin composition used for the correction layer may be the same as that used for the bonding layer. Suitable compositions are mixtures of acrylic acid esters (acrylates) or methacrylic acid esters (methacrylates). In Netherlands Patent Application 8400868 (PHN 10,975) in the name of the Applicants, compositions are stated which are particularly suitable for use in the replica lens according to the invention. In general, in choosing the synthetic resin composition for the correction layer attention will be paid in particular to the optical quality, such as a high refractive index, of the cured synthetic resin layer. A suitable composition is ethoxylated bisphenol-A dimethacrylate which after curing with UV-light provides a correction layer having a refractive index of approximately 1.56. In choosing the composition of the bonding layer the emphasis will be laid in the bonding properties. The layer must adhere to the glass or quartz of the lens body and, for example, to the metal of a mounting. The composition based on acrylates or methacrylates will then preferably have extra polar groups. Suitable compositions are those containing epoxyacrylates, urethaneacrylates, or mixtures thereof.

The correction layer and the bonding layer may be bonded together and thus form one assembly.

A further preferred form is characterized in that the transparent lens body comprises, in addition to a correction layer, also an upright edge of a synthetic resin, the surface of which is provided at least partly with a reflection layer and thus forms a mirror bonded integrally to the lens body.

According to another preferred form of the replica lens in accordance with the invention, the lens body has an annular mounting or an annular magnet which is perpendicular to the optical axis of the lens and is bonded to the lens body by means of a synthetic resin bonding layer.

In an interesting embodiment of the replica lens the lens, body is a transparent spherical body which has two correction layers of a synthetic resin situated diametrically oppositely to each other and have an aspherical profile, as well as an annular mounting which is perpendicular to the optical axis of the lens and is bonded to the lens body by means of a synthetic resin bonding layer.

The invention also relates to a method of manufacturing the above described replica lens. The method according to the invention is characterized in that (1) a curable liquid synthetic resin composition is provided between a refractive surface of a transparent lens body and the surface of a mold the profile of which is the negative of the desired optical profile of the replica lens, (2) the lens body and the mold are accurately positioned relative to each other, whereby between the mold and the lens body; (3) a bonding layer of a curable liquid synthetic resin is provided between a non-refractive surface of the lens body and a surface of an optical component or an auxiliary means; (4) the correction layer and the bonding layer are cured whereby the optical component or the auxiliary means is bonded to the lens body; and (5) the lens is removed from the mold.

The method according to the invention presents the advantage that in accurately positioning the auxiliary means on the optical component, the already present precise arrangement of the mold (or molds) with respect to the lens body is used. In fact this latter precision in the arrangement is necessary to provide the correction layer.

In positioning the auxiliary means of the optical component, an adjusting surface of the mold which is present for this purpose is preferably used. Such an adjusting surface may be, for example, a surface which is perpendicular to the optical axis and the mechanical axis of the lens and which serves as a reference, for example, for the lower side of an annular mounting.

Further advantages are that no separate procedure is necessary for providing and positioning the auxiliary means (for example the mounting) of the optical component; the replica lens due to, for example, the mounting, can more easily be released from the mold (molds); and the possibility of damage is smaller.

BRIEF DESCRIPTION OF THE DRAWINGS

The invention will now be described in greater detail with reference to the drawing, in which.

DESCRIPTION OF THE PREFERRED EMBODIMENTS

Figure 1:
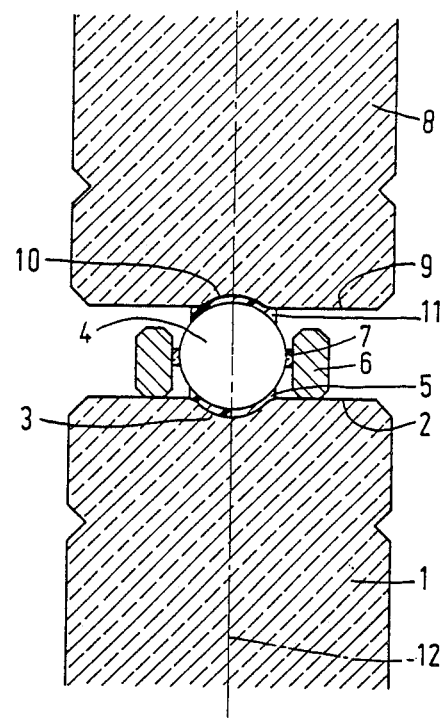
FIG. 1 is a cross-sectional view of a replica lens according to the invention placed on a quartz mold.

Reference numeral 1 in FIG. 1 denotes a mold manufactured from quartz. The upper surface 2 of the mold 1 comprises an accurately defined aspherical surface 3. In manufacturing the replica lens according to the invention, first of all a small quantity (for example, a drop) of a UV-light curable composition based on methacrylic acid esters, in particular ethoxylated bisphenol-A dimethacrylate, is provided on the aspherical surface 3. A ball 4 manufactured from quartz or UV-transparent glass is then pressed against the surface 3. The composition is spread between the surface 3 and the ball 4, a correction layer 5 being formed. An annular mounting 6 manufactured, for example, from glass, brass, aluminum or a synthetic resin, is provided on the inside with a layer 7 of a UV-light curable composition based on acrylic acid esters, in particular an epoxyacrylate or urethaaneacrylate. Annular mounting 6 is provided around ball 4, the lower side of mounting 6 bearing on the upper surface 2 of mold 1. This upper surface 2 is perpendicular to the optical axis of the aspherical surface 3.

A small quantity of the above mentioned composition of ethoxylated bisphenol-A dimethacrylate is then provided on the top of the spherical ball 4. Mold 8 also has an aspherical surface part 10 on its lower surface 9. Mold 8 is pressed with surface part 10 on ball 4, a correction layer 11 is formed. The assembly is then exposed to UV-light. Molds 1 and 8 are aligned relatively to each other. This means that the ball 4 is always positioned in the same manner between the molds 1 and 8 and the correction layers 5 and 11 are always situated correctly with respect to each other. This positioning is fixed upon exposure, mounting 6 being bonded to ball 4 via cured layer 7. The optical axis 12 of the replica lens and the mechanical axis of the mounting now coincide. As a result of the exposure, correction layers 5 and 11 are also cured and the lens may be removed from the molds 1 and 8.

Figure 2:
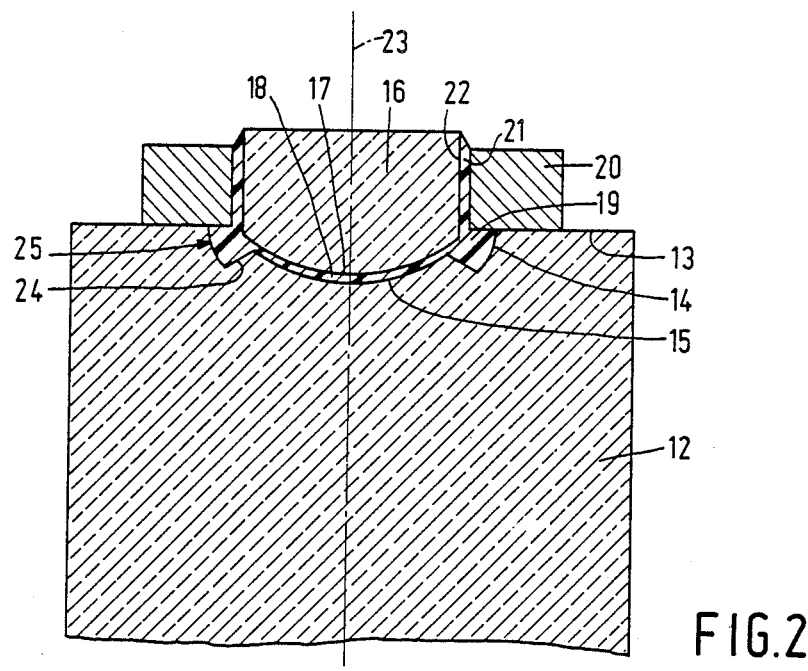
FIG. 2 is a cross-sectional view of another embodiment of a replica lens according to the invention.

In an alternative embodiment of the invention, reference numeral 12 in FIG. 2 denotes a mold manufactured from quartz. The upper surface 13 of mold 12 has an annular recess 14 and an aspherical surface 15 present inside the recess. A liquid, UV-light curable composition based on methacrylic acid esters is provided in recess 14 and on the aspherical surface 15. A lens body 16 manufactured from quartz is pressed with its spherical surface 17 against the aspherical surface 15. A correction layer 18 of the liquid composition is formed between the surfaces 15 and 17. Layer 18 communicates with and forms one assembly with the composition 19 present in recess 14. An annular magnet 20 whose inner surface has a layer 21 of a liquid, UV-light curable composition of acrylic acid esters is provided around the cylindrical non-refractive surface 22 of lens body 16. The lower surface of the annular magnet 20 engages the upper surface 13 of mould 12. This upper surface 13 is perpendicular to the optical axis 23 of the aspherical surface 15 and forms a reference surface for the positioning of annular magnet 20. The assembly is exposed to UV-light whereby, the UV curable composition 18, 19 and 21 is cured and consequently annular magnet 20 is bonded to lens body 16. The mechanical axis of annular magnet 20 coincides with the optical axis 23. The lens may be removed from the mold. Finally, surface 24 of the resulting edge part 25 is provided with a reflection layer of metal, for example, by using a vapour deposition process. Herewith the resulting replica lens is provided with a mirror bonded integrally to the lens body 16.

What is claimed is:

1. A replica lens having a transparent lens body at least one refractive surface of which has a correction layer of a light-cured synthetic resin which gives the lens body the desired optical profile, characterized in that the lens body has at least one member selected from the group consisting of auxiliary means and optical components which member is bonded to the lens body by using a bonding layer of a light-cured synthetic resin.

2. A replica lens as claimed in claim 1, characterized in that the correction layer and the bonding layer are bonded together.

3. A replica lens as claimed in claim 2 wherein said correction layer is ethoxylated bisphenol-A dimethacrylate and said bonding layer is selected from the group of epoxyacrylate and urethaneacrylate resins.

4. A replica lens as claimed in claim 1 or 2, characterized in that the transparent lens body comprises, in addition to a correction layer, also an upright edge of a synthetic resin whose surface is provided at least partly with a reflection layer and thus forms a mirror which is bonded integrally to the lens body.

5. A replica lens as claimed in claim 1, characterized in that the lens body has auxiliary means comprising a member selected from the group consisting of an annular mounting and an annular magnet, which member is perpendicular to the optical axis of the lens and is bonded to the lens body by means of a synthetic resin bonding layer.

6. A replica lens as claimed in claim 5, characterized in that the lens body is a transparent spherical body which has two correction layers of a synthetic resin which are situated diammetrically oppositely to each other and have an aspherical profile as well as an annular mounting which is perpendicular to the optical axis of the lens and is bonded to the lens body by means of a synthetic resin bonding layer.

7. A replica lens as claimed in claim 5 in which said member is an annular mounting.

8. A replica lens as claimed in claim 7 in which said annular mounting is selected from the group of glass, brass, aluminum or a synthetic resin.

9. A replica lens as claimed in claim 8 in which the correction layer is ethoxylated bisphenol-A dimethacrylate; and said bonding layer is selected from the group of epoxyacrylate and urethaneacrylate resins.

10. A replica lens as claimed in claim 5 in which said member is an annular magnet.

11. A replica lens as claimed in claim 1 wherein said correction layer is a UV-light cured ethoxylated bisphenol-A dimethacrylate.

12. A method of manufacturing a replica lens having a transparent lens body at least one refractive surface of which has a correction layer of a synthetic resin, characterized in that (1) a curable liquid synthetic resin composition is provided between a refractive surface of a transparent lens body and the surface of a mold whose profile is the negative of the desired optical profile of the replica lens; (2) the lens body and the mold are accurately positioned with respect to each other, wherein a correction layer of a synthetic is formed between the mold and the lens body; (3) a bonding layer of a curable liquid synthetic resin composition is provided between a non-refractive surface of the lens body and a surface of a member selected from the group consisting of an optical component and an auxiliary means; (4) the correction layer and the bonding layer are cured by exposure to light whereby the said member is bonded to the lens body; and (5) the lens is removed from the mold.

13. A method as claimed in claim 12, characterized in that an adjusting surface of the mold is used for positioning the optical component or auxiliary means member.

14. A method of manufacturing a replica lens as claimed in claim 13 in which said correction layer and said bonding layer are cured by exposure of the same to ultraviolet light.

15. A method of manufacturing a replica lens as claimed in claim 14 wherein the correction layer is ethoxylated bisphenol-A dimethacrylate; and said bonding layer is selected from the group of epoxy acrylate and urethaneacrylate resins.

* * * * *